(12) United States Patent
Chen

(10) Patent No.: US 9,912,844 B2
(45) Date of Patent: Mar. 6, 2018

(54) VIDEO SIGNAL OUTPUT SYSTEM AND METHOD

(71) Applicant: MStar Semiconductor, Inc., Hsinchu Hsien (TW)

(72) Inventor: Chun-Yu Chen, Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 15/368,919

(22) Filed: Dec. 5, 2016

(65) Prior Publication Data

US 2017/0331985 A1 Nov. 16, 2017

(30) Foreign Application Priority Data

May 13, 2016 (TW) .............................. 105114912 A

(51) Int. Cl.
*H04N 5/06* (2006.01)
(52) U.S. Cl.
CPC ..................................... *H04N 5/06* (2013.01)
(58) Field of Classification Search
CPC ........................................................ H04N 5/06
See application file for complete search history.

(56) References Cited

U.S. PATENT DOCUMENTS

| | | | | |
|---|---|---|---|---|
| 5,781,250 A * | 7/1998 | Jun, II | .............. | G06F 1/32 348/705 |
| 5,956,046 A * | 9/1999 | Kehlet | .............. | G06F 3/1438 345/1.3 |
| 6,181,300 B1 * | 1/2001 | Poon | .............. | G09G 5/12 345/213 |
| 6,195,086 B1 * | 2/2001 | Perlman | .............. | G09G 5/12 345/1.1 |
| 6,424,320 B1 * | 7/2002 | Callway | .............. | G06F 3/1438 345/1.1 |
| 6,754,234 B1 * | 6/2004 | Wiesner | .............. | H04N 5/126 348/E5.021 |
| 7,171,106 B2 * | 1/2007 | Elberbaum | ...... | G08B 13/19634 348/143 |
| 7,663,632 B2 * | 2/2010 | Callway | .............. | G06F 3/1438 345/502 |
| 8,022,894 B2 * | 9/2011 | Naito | .............. | G06F 3/1446 345/1.1 |
| 8,310,489 B2 * | 11/2012 | Callway | .............. | G06F 3/1438 345/502 |

(Continued)

*Primary Examiner* — Brian Yenke
(74) *Attorney, Agent, or Firm* — Edell, Shapiro & Finnan, LLC

(57) ABSTRACT

A video signal output system includes a first video chip and a second video chip. The first video chip includes a first video signal output circuit and a simulation signal generating circuit. The simulation signal generating circuit outputs a first simulation signal and a second simulation signal. The second video chip includes a second video signal output circuit. The first video signal output circuit generates a first horizontal synchronization signal according to the first simulation signal, and generates a first vertical synchronization signal according to the second simulation signal. The second video signal output circuit generates a second horizontal synchronization signal according to the first simulation signal, and generates a second vertical synchronization signal according to the second simulation signal.

12 Claims, 6 Drawing Sheets

(56) References Cited

U.S. PATENT DOCUMENTS

| | | | |
|---|---|---|---|
| 8,878,859 B1* | 11/2014 | van Scherrenburg | G09G 5/006 |
| | | | 345/520 |
| 2003/0193459 A1* | 10/2003 | Kim | G09G 3/006 |
| | | | 345/87 |
| 2004/0186602 A1* | 9/2004 | Andersen | H03F 1/523 |
| | | | 700/94 |
| 2007/0152996 A1* | 7/2007 | Shen | G09G 5/008 |
| | | | 345/213 |
| 2007/0159421 A1* | 7/2007 | Peker | H05B 33/0872 |
| | | | 345/82 |
| 2011/0115837 A1* | 5/2011 | de Sa e Silva | G09G 5/003 |
| | | | 345/691 |
| 2014/0154994 A1* | 6/2014 | Mason | H04N 21/43635 |
| | | | 455/66.1 |
| 2015/0215597 A1* | 7/2015 | Xu | G11B 20/10527 |
| | | | 386/201 |
| 2016/0210927 A1* | 7/2016 | Cho | G09G 3/3677 |

* cited by examiner

VIDEO SIGNAL OUTPUT SYSTEM AND METHOD

This application claims the benefit of Taiwan application Serial No. 105114912, filed May 13, 2016, the subject matter of which is incorporated herein by reference.

BACKGROUND OF THE INVENTION

Field of the Invention

The invention relates in general to a video signal output system and method, and more particularly to a video signal output system having a synchronization signal simulation function.

Description of the Related Art

Various kinds of innovated display devices have been developed as the technology advances. FIG. 1 shows a schematic diagram of a conventional video signal output system 100. The video signal output system 100 is for displaying an image on a display device 190, and includes a video chip 110. A video input signal IN10 is first appropriately processed by the video chip 110, and then transmitted to the display device 190 to be displayed. For example, the video chip 110 usually performs processes such as decompression, resolution adjustment, image rotation, image chrominance adjustment, and image sharpness adjustment.

The video chip 110 includes a video signal output circuit 113 and a video input end 114. The video input signal IN10 is inputted from the video input end 114. The video signal output circuit 113 generates a horizontal synchronization signal and a vertical synchronization signal according to the video input signal IN10, and outputs a video output signal OUT10 including the horizontal synchronization signal and the vertical synchronization signal to the display device 190. The display device 190 displays the image according to the horizontal synchronization signal and the vertical synchronization signal to ensure that the image is properly displayed.

During a booting process, the video input signal IN10 may not be necessarily inputted into the video chip 110. Thus, the video signal output circuit 113 generates the horizontal synchronization signal and the vertical synchronization signal itself to ensure that the image is properly displayed.

FIG. 2 shows a schematic diagram of another conventional video signal output system 200. For a larger display device 290, the video signal output system 200 needs to adopt a dual-chip structure to increase the processing performance. The video signal output system 200 includes a first video chip 210 and a second video chip 22. The first video chip 210 includes a first video signal output circuit 213 and a first video input end 214. The second video chip 220 includes a second video signal output circuit 223 and a second video input end 224.

The video input signal IN20 is divided into a first video input signal IN21 of the left half of the image, and a second video input signal IN22 of the right half of the image. The first video input signal IN21 is inputted from the first video input end 214. The first video signal output circuit 223 generates the first horizontal synchronization signal and the first vertical synchronization signal according to the first video input signal IN21, and outputs a first video output signal OUT21 including the horizontal synchronization signal and the first vertical synchronization signal to the display device 290.

The second video input signal IN22 is inputted from the second video input end 224. The second video signal output circuit 223 generates the second horizontal synchronization signal and the second vertical synchronization signal according to the second video input signal IN22, and outputs a second video output signal OUT22 including the second horizontal synchronization signal and the second vertical synchronization signal to the display device 290.

The display device 290 displays the left-half image according to the first horizontal synchronization signal and the first vertical synchronization signal, and displays the right-half image according to the second horizontal synchronization signal and the second vertical synchronization signal to ensure that the image is properly displayed.

During a booting process, the video input signal IN20 may not be necessarily inputted to the video signal output system 200. When the first video signal output circuit 213 itself generates the first horizontal synchronization signal and the first vertical synchronization signal, and the second video signal output circuit 223 itself generates the second horizontal synchronization signal and the second vertical synchronization signal, not only the first horizontal synchronization signal and the second horizontal synchronization signal, but also the first vertical synchronization signal and the second vertical synchronization signal may be asynchronous. In the event of asynchronous synchronization signals, the display device 290 may not be properly lit up.

SUMMARY OF THE INVENTION

The invention is directed to a video signal output system with a synchronization signal simulation function. The video signal output system utilizes a simulation signal to generate two sets of horizontal synchronization signals and two sets of vertical synchronization signals. Thus, asynchronous signals can be effectively prevented to ensure that the image of a display device is properly displayed.

According to an aspect of the present invention, a video signal output system with a synchronization signal simulation function is provided. The video signal output system displays an image on a display device. For example, the video signal output system and the display device are disposed on a television. The video signal output system includes a first video chip and a second video chip. The first video chip includes a first video signal output circuit and a simulation signal generating circuit. The first video signal output circuit outputs a first video output signal to the display device to display a part of the image. The first video output signal includes a first horizontal synchronization signal and a first vertical synchronization signal. The simulation signal generating circuit outputs a first simulation signal and a second simulation signal. The second video chip includes a second video signal output circuit. The second video signal output circuit outputs a second video output signal to the display device to display the remaining part of the image. The second video output signal includes a second horizontal synchronization signal and a second vertical synchronization signal. In a simulation mode, the first video signal output circuit generates the first horizontal synchronization signal according to the first simulation signal, and generates the first vertical synchronization signal according to the second simulation signal; the second video signal output circuit generates the second horizontal synchronization signal according to the first simulation signal, and generates the second vertical synchronization signal according to the second simulation signal.

According to another aspect of the present invention, a video signal output method with a synchronization simulation function is provided. The video signal output method is applied to a display device to display an image. The video signal output method includes steps of: outputting a first video output signal to the display device to display a part of the image, the first video output signal including a first horizontal synchronization signal and a first vertical synchronization signal; outputting a second video output signal to the display device to display the remaining part of the image, the second video output signal including a second horizontal synchronization signal and a second vertical synchronization signal; outputting a first simulation signal and a second simulation signal; in a simulation mode, generating the first horizontal synchronization signal according to the simulation signal, and generating the first vertical synchronization signal according to the second simulation signal; and generating the second horizontal synchronization signal according to the first simulation signal, and generating the second vertical synchronization signal according to the second simulation signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
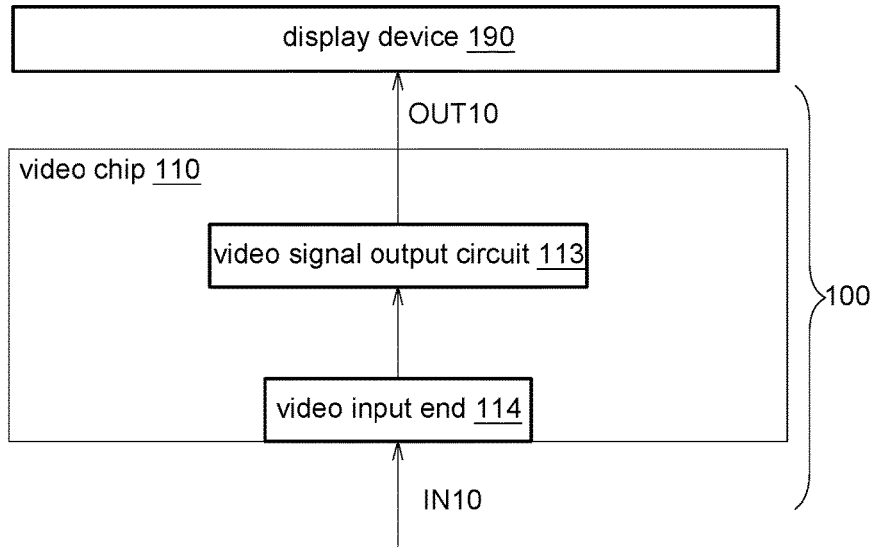
FIG. 1 is a schematic diagram of a conventional video signal output system.
Figure 2:
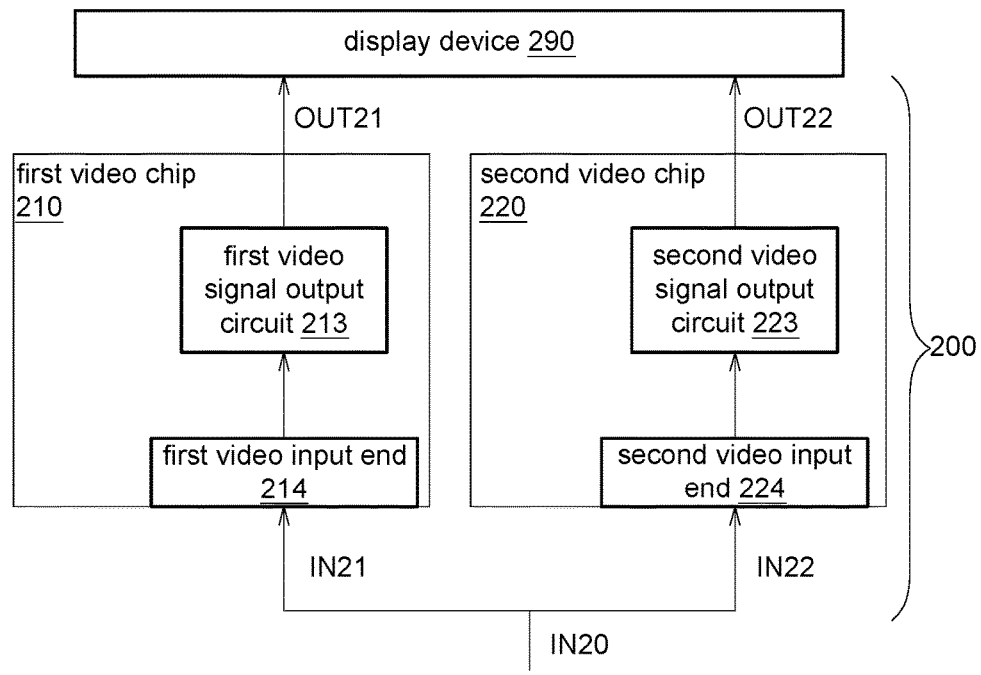
FIG. 2 is a schematic diagram of another conventional video signal output system.
Figure 3:
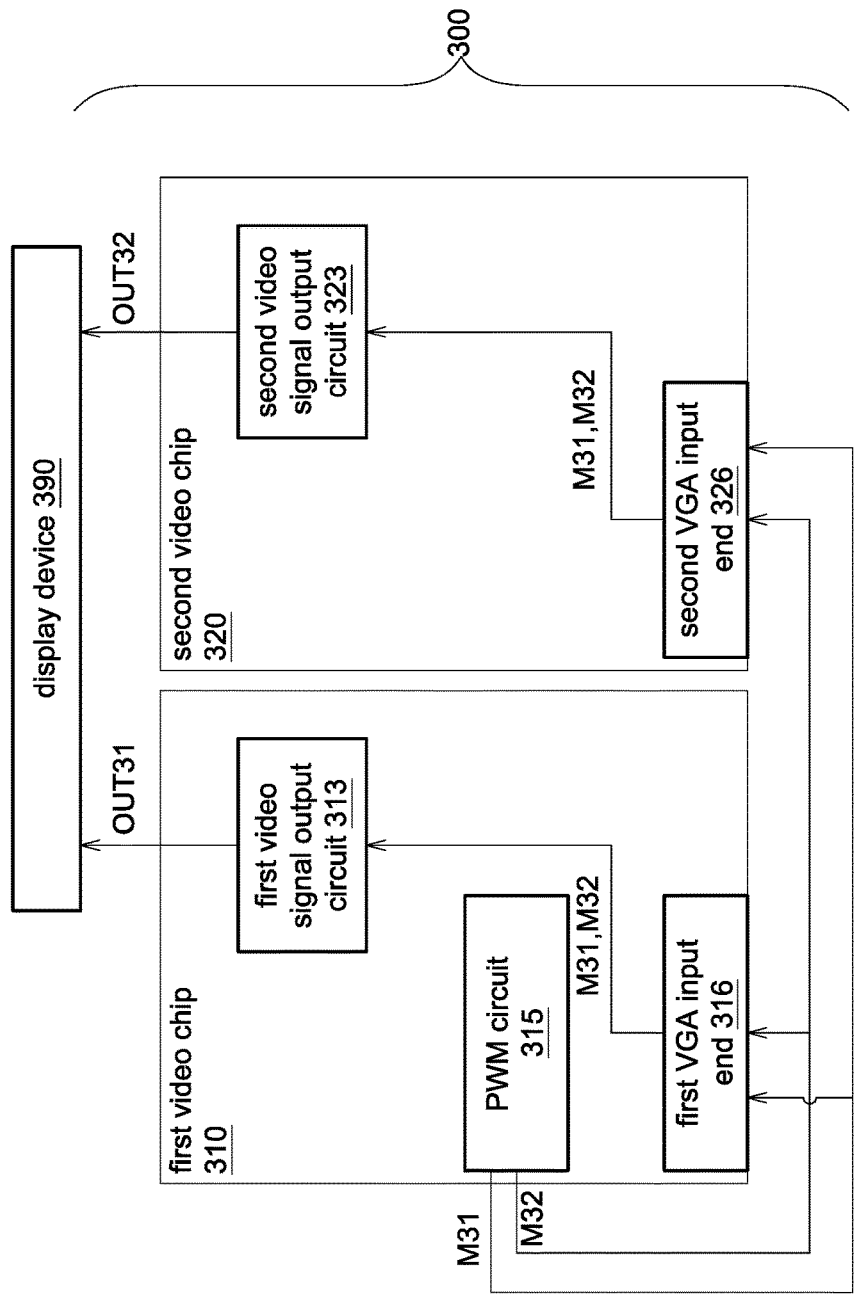
FIG. 3 is a schematic diagram of a video signal output system with a synchronization signal simulation function according to an embodiment of the present invention.

FIG. 3 shows a schematic diagram of a video signal output system 300 with a synchronization signal simulation function according to an embodiment of the present invention. The video signal output system 300 is adapted to display an image on a display device 390, and includes a first video chip 310 and a second video chip 320. The first video chip 310 includes a first video signal output circuit 313, a pulse width modulation (PWM) circuit 315 and a first video graphics array (VGA) input end 316. The second video chip 320 includes a second video signal output circuit 323 and a second VGA input end 326.

The first video signal output circuit 313 outputs a first video output signal OUT31 to the display device 390 to display a part of the image. The second video signal output circuit 323 outputs a second video output signal OUT32 to the display device 390 to display the remaining part of the image. For example, the display device 390 displays the left half of the image according to the first video output signal OUT31 and displays the right half of the image according to the second video output signal OUT32.

The first video output signal OUT31 includes a first horizontal synchronization signal and a first vertical synchronization signal. The second video output signal OUT32 includes a second horizontal synchronization signal and a second vertical synchronization signal. The first horizontal synchronization signal and the second horizontal synchronization signal need to be synchronous, or else the display device 390 may not be properly lit up. Similarly, the first vertical synchronization signal and the second vertical synchronization signal need to be synchronous, or else the display device 390 may not be properly lit up.

In one embodiment, after the video signal output system 300 is booted, the display device 390 usually displays a startup image. The startup image is usually an on-screen display (OSD) picture. At this point, there may not be any video input signal inputted into the video signal output system 300, and thus the first video signal output circuit 313 and the second video signal output circuit 323 are incapable of generating the first horizontal synchronization signal and the second horizontal synchronization signal that are synchronous with each other according to the video input signal, and are incapable of generating the first vertical synchronization signal and the second vertical synchronization signal that are synchronous with each other according to the video input signal. Thus, after the video signal output system 300 is booted, it directly enters a simulation mode.

Figure 4:
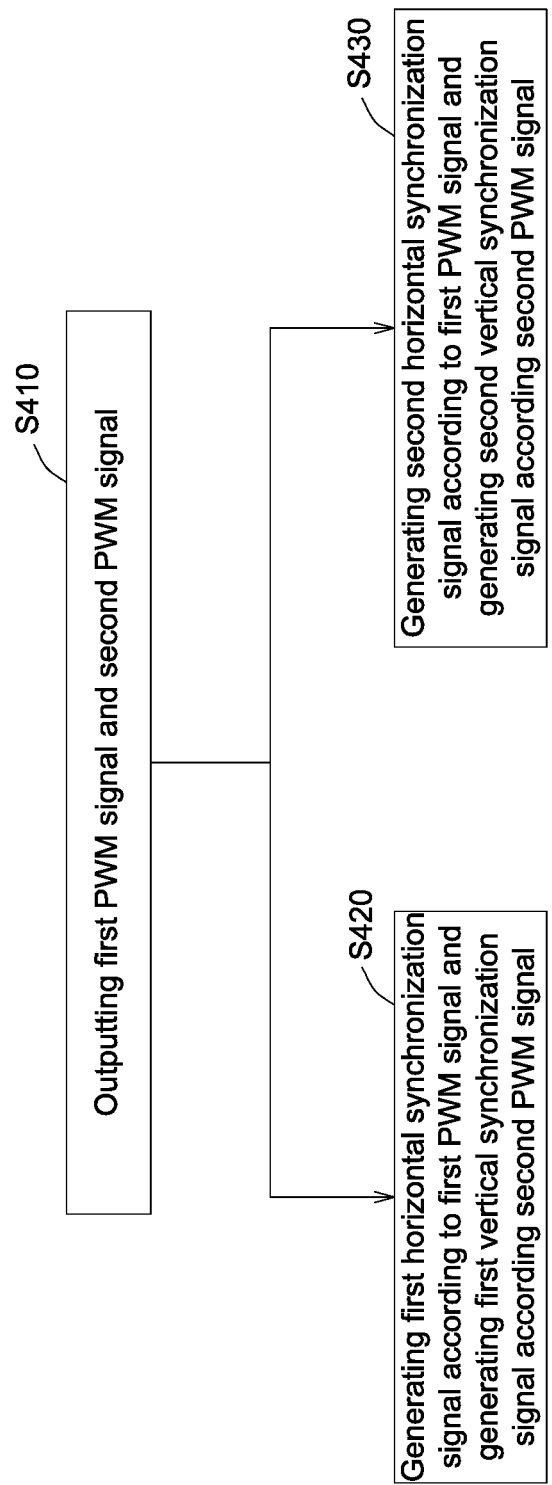
FIG. 4 is a flowchart of a video signal output method in a simulation mode according to an embodiment of the present invention.

FIG. 4 shows a flowchart of a video signal output method in a simulation mode according to an embodiment of the present invention. For example but not limited to, the video signal output method is applied with the video signal output system 300 as shown in FIG. 3 for illustration purposes.

In step S410, the PWM circuit 315 outputs a first PWM signal M31 and a second PWM signal M32.

In step S420, the first video signal output circuit 313 generates the first horizontal synchronization signal according to the first PWM signal M31, and generates the first vertical synchronization signal according to the second PWM signal M32.

In step S430, the second video signal output circuit 323 generates the second horizontal synchronization signal according to the first PWM signal M31, and generates the second vertical synchronization signal according to the second PWM signal M32.

That is to say, the first horizontal synchronization signal and the second horizontal synchronization signal are generated according to the same first PWM signal M31, such that the first horizontal synchronization signal and the second horizontal synchronization signal may be synchronous with each other. Further, the first vertical synchronization signal and the second vertical synchronization signal are generated according to the same second PWM signal M32, such that the first vertical synchronization signal and the second vertical synchronization signal may be synchronous with each other. Thus, in the absence of a video input signal, the issue that the display device 390 may not be properly lit up for the reason that the first video signal input circuit 313 and the second video signal input circuit 323 are incapable of generating the first horizontal synchronization signal and the second horizontal synchronization signal that are synchronous with each other, and are incapable of generating the first vertical synchronization signal and the second vertical synchronization signal are synchronous with each other, is solved.

In one embodiment, the frequency of the first PWM signal M31 is about 60 kHz, and the frequency of the second PWM signal M32 is about 60 Hz, so as to respectively satisfy specifications for 1280*960@60 Hz, as defined by VESA. However, the above example is not to be construed as a limitation to the present invention, given that the first horizontal synchronization signal and the first vertical synchronization signal that the first video signal output circuit 313 generates according to the first PWM signal M31 and the second horizontal synchronization signal and the second vertical synchronization signal that the second video signal output circuit 323 generates according to the second PWM signal M32 allow t the display device 390 to be properly lit up.

In one embodiment, the first video chip 310 receives the first PWM signal M31 through an existing 13$^{th}$ pin of the first VGA input end 316, and receives the second PWM signal M32 through an existing 14$^{th}$ pin of the second VGA input end 316. The second video chip 320 receives the first PWM signal M31 through an existing 13$^{th}$ pin of the second VGA input end 326, and receives the second PWM signal M32 through an existing 14$^{th}$ pin of the second VGA input end 326. Thus, without modifying the internal circuit design, the first video chip 310 and the second video chip 320 may generate the synchronous horizontal synchronization signals and synchronous vertical synchronization signals using the existing first VGA input end 316 and second VGA input end 326.

Figure 5:
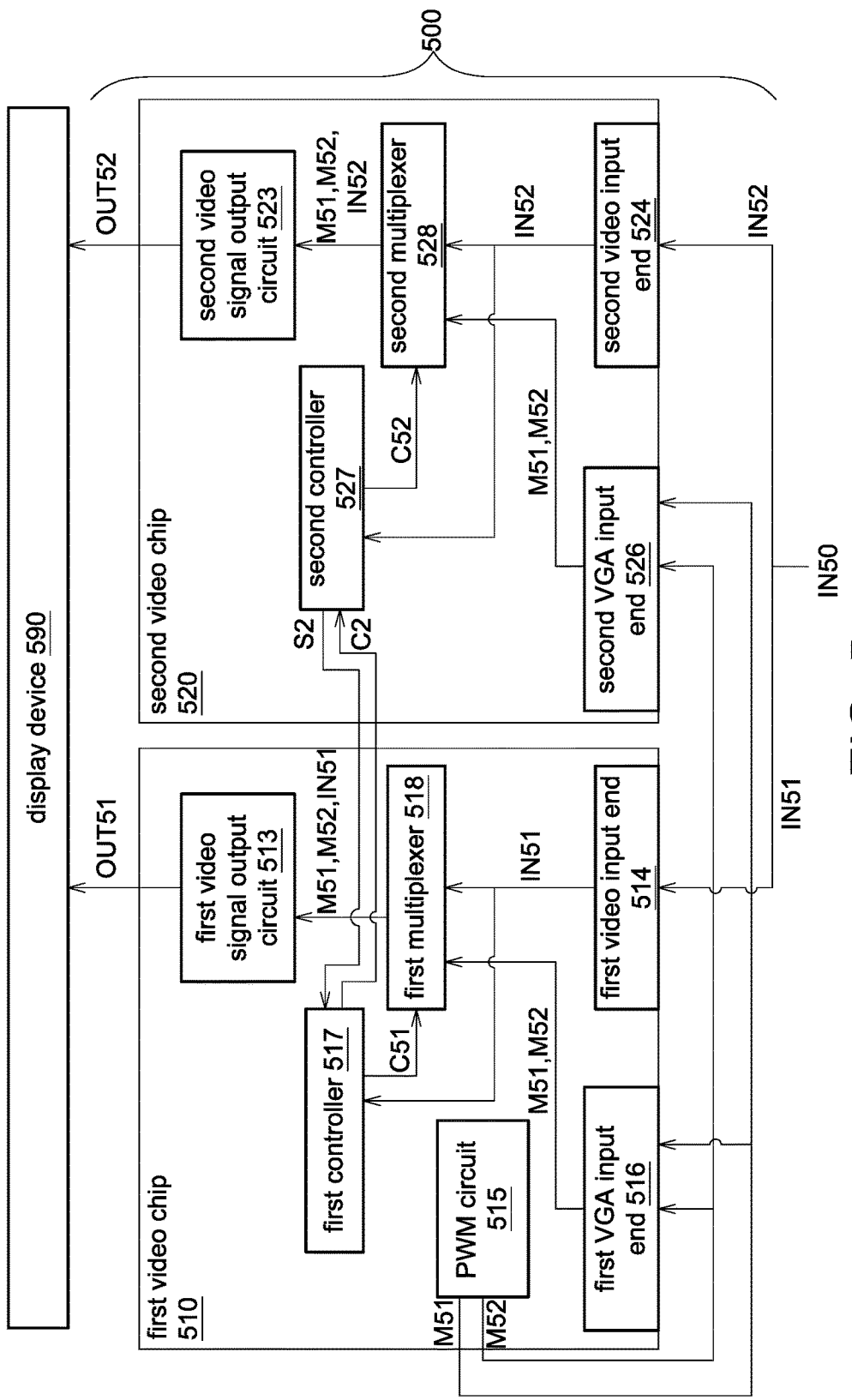
FIG. 5 is a schematic diagram of a video signal output system with a synchronization signal simulation function according to an embodiment of the present invention.

FIG. 5 shows a schematic diagram of a video signal output system 500 with a synchronization signal simulation function according to an embodiment of the present invention. The video signal output system 500 is applied to a display device 590 to display an image, and includes a first video chip 510 and a second video chip 520. A video input signal IN50 is divided into a first video input signal IN51 and a second video input signal IN52. The first video input signal IN51 is inputted to the first video chip 510 through a first video input end 514, and the second video input signal IN52 is inputted to the second video chip 520 through a second video input end 524.

The first video chip 510 includes a first video signal output circuit 513, the first video input end 514, a PWM circuit 515, a first VGA input end 516, a first controller 517 and a first multiplexer 518. The second video chip 520 includes a second video signal output circuit 523, the second video input end 524, a second VGA input end 526, a second controller 527 and a second multiplexer 528. For example but not limited to, the first video input end 514 and the second input end 524 may be DisplayPort (DP).

Similarly, the first video signal output circuit 513 outputs a first video output signal OUT51 to the display device 590 to display a part of the image, and the second video signal output circuit 523 outputs a second video output signal OUT52 to the display device 590 to display the remaining part of the image. For example, the display device 590 displays the left half of the image according to the first video output signal OUT51, and displays the right half of the image according to the second video output signal OUT52. The first video output signal OUT51 includes a first horizontal synchronization signal and a first vertical synchronization signal, and the second video output signal OUT52 includes a second horizontal synchronization signal and a second vertical synchronization signal.

Figure 6:
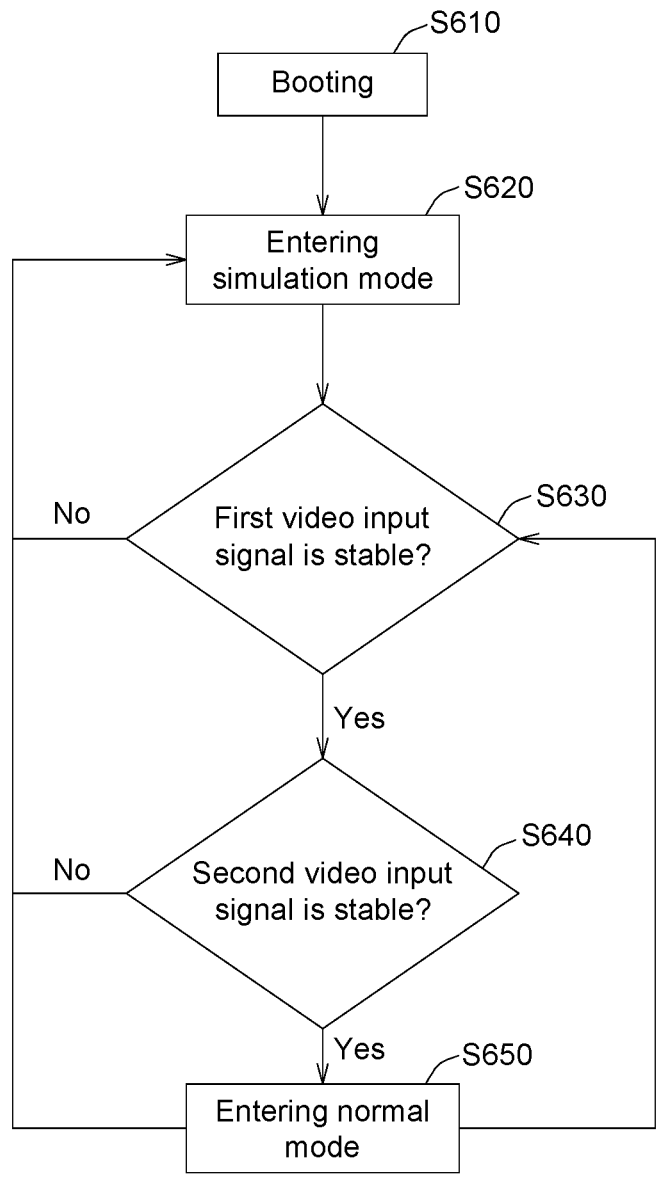
FIG. 6 is a flowchart of a method for switching between a simulation mode and a booting mode.

The video output system 500 is operable in a simulation mode and a normal mode. In one embodiment, the simulation mode and the normal mode may be switched according to a stable state of the first video input signal INT51 and the second video input signal INT52. Associated details are given with an example in FIG. 6. FIG. 6 shows a flowchart of a method for switching between the simulation mode and the normal mode.

In step S610, the video signal output system 500 is booted.

In step S620, the video signal output system 500 directly enters the simulation mode. In the simulation mode, the first controller 517 outputs a first control signal C51 to the first multiplexer 518 to control the first multiplexer 518 to output a first PWM signal M51 and a second PWM signal M52 to the first video signal output circuit 513. The first video signal output circuit 513 generates the first horizontal synchronization signal according to the first PWM signal M51, and generates the first vertical synchronization signal according to the second PWM signal M52. The second controller 527 outputs a second control signal C52 to the second multiplexer 528 to control the second multiplexer 528 to output the first PWM signal M51 and the second PWM signal M52 to the second video signal output signal 523. The second video signal output circuit 523 generates the second horizontal synchronization signal according to the first PWM signal M51, and generates the second vertical synchronization signal according to the second PWM signal M52.

In step S630, the first controller 517 determines whether the first video input signal IN51 is stable according to the first video input signal IN51. Step S640 is performed when the first controller 517 determines that the first video input signal IN51 is stable, or else step S620 is performed when the first controller 517 determines that the first video input signal IN51 is unstable.

In step S640, the first controller 517 determines whether the second video input signal IN52 is stable according to a state signal S2 outputted from the second controller 527. Step S650 is performed when the first controller 517 determines that the second video input signal IN52 is stable according to the state signal S2, or else step S620 is performed when the first controller 517 determines that the second video input signal IN52 is unstable according to the state signal S2. The second controller 527 determines whether the second video input signal IN52 is stable according to the second video input signal IN52. When the second controller 517 determines that the second video input signal IN52 is stable, it outputs the state signal S2, which indicates that the second video input signal IN52 is stable, to the first controller 517. When the second controller 517 determines that the second video input signal IN52 is unstable, it outputs the state signal S2, which indicates that the second video signal IN52 is unstable, to the first controller 517.

In step S650, the video signal output system 500 enters the normal mode. The first controller 517 outputs the first control signal C51 to the first multiplexer 518 to control the first multiplexer 518 to output the first video input signal IN51 to the first video signal output circuit 513. The first video signal output circuit 513 generates the first horizontal synchronization signal and the first vertical synchronization signal according to the first video input signal IN51. Further, the first controller 517 outputs the control signal C2 to the second controller 527 to control the second controller 527 to output the second control signal C52 to the second multiplexer 528, to further control the second multiplexer 528 to output the second video input signal IN52 to the second video signal output circuit 523. The second video signal output circuit 523 generates the second horizontal synchronization signal and the second vertical synchronization signal according to the second video input signal IN52.

After the video signal output system 500 enters the normal mode, the determinations of step S630 and S640 are iterated to detect whether the first video input signal IN51 or the second video input signal IN52 is in an unstable state. Upon detecting the first video input signal IN51 or the second video input signal IN52 is in an unstable state, the video signal output system 500 enter the simulation mode again and the process returns to step S620. In one embodiment, when the video signal output system 500 enters the simulation mode because the video input signal IN51 or the second video input signal IN52 is in an unstable state, the video signal output system 500 causes the display device 590 to display an alert image, which is usually an on-screen display (OSD) picture to alert the user that the current video input signal is unstable.

Figure 7:
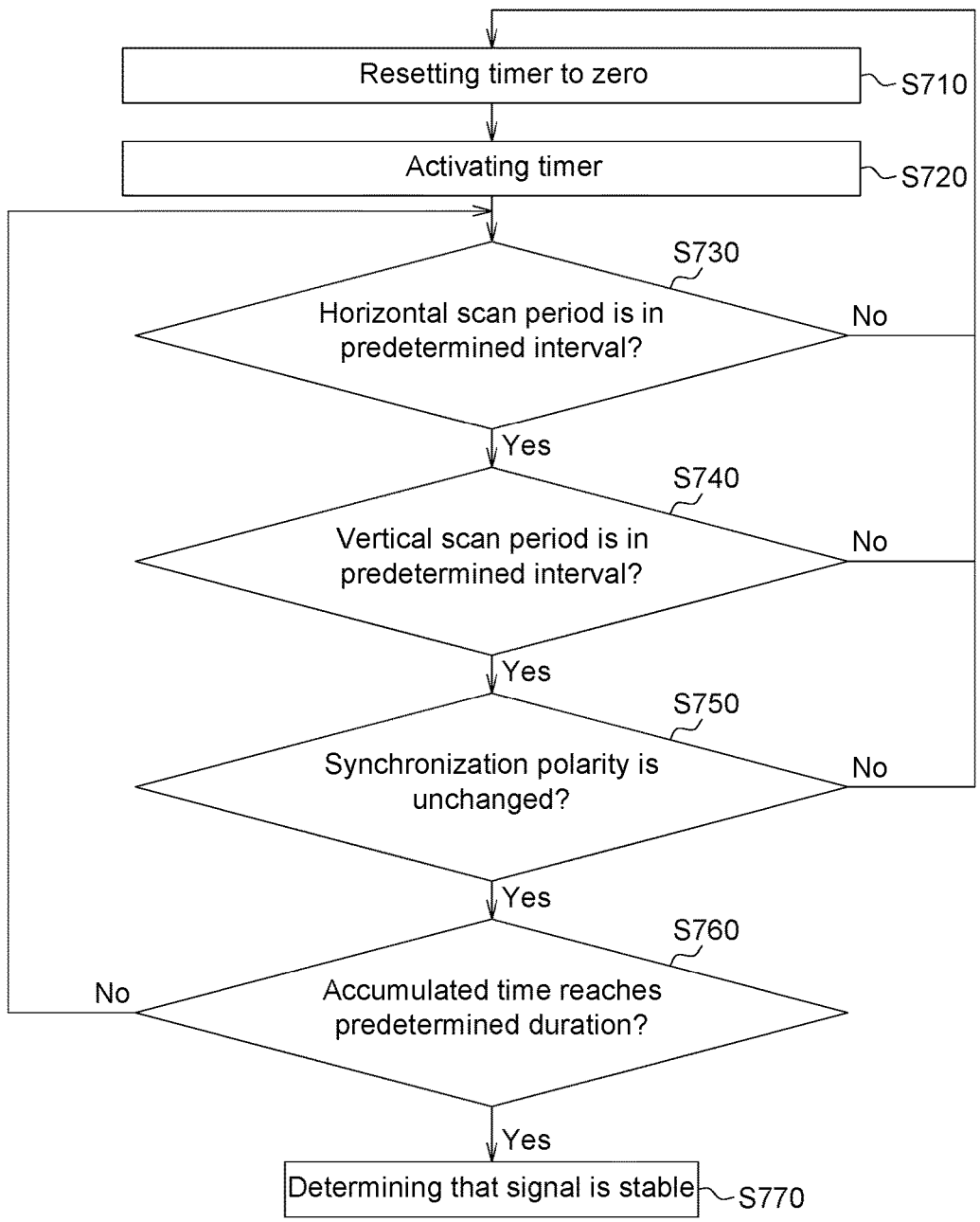
FIG. 7 is a flowchart of a method for determining a stable state of a video input signal.

FIG. 7 shows a flowchart of a stable state determining method for a video input signal. The first controller 517 may determine whether the first video input signal IN51 is stable through the method shown in FIG. 7. Similarly, the second controller 527 may determine whether the second video input signal IN52 is stable through the determination method shown in FIG. 7.

In step S710, a timer is reset to zero.

In step S720, the timer is activated to start counting an accumulated time.

In step S730, it is determined whether a horizontal scan period is in a predetermined interval, e.g., ±80.

In step S740, it is determined whether a vertical scan period is in a predetermined interval, e.g., ±4.

In step S750, it is determined whether a synchronization polarity is unchanged.

In one embodiment, orders for performing step S730, step S740 and step S750 may be modified. Alternatively, in one embodiment, step S730, step S740 and step S750 may be performed simultaneously.

When the determination result of any of step S730, step S740 and step S750 is negative, step S710 is iterated to reset the timer to zero and to reactivate the timer in step S720. Only when the determination results of all of step S730, step S740 and step S750 are affirmative, step S760 is performed.

In step S760, it is determined whether the accumulated time reaches a predetermined duration. When the accumulated time does not reach the predetermined duration (e.g., 100 ms), the determinations of step S730, step S740 and step S750 are iterated. Step S760 is performed only when the accumulated time reaches the predetermined duration.

That is to say, in order to determine whether the three conditions above last for the predetermined duration, before the accumulated time has not yet reached the predetermined duration, the determinations of step S730, step S740 and step S750 are repeatedly performed. Before the accumulated time reaches the predetermined duration, if any of the conditions is not satisfied, the process returns to step S710 to re-time the accumulated time. When the accumulated time reaches the predetermined duration and all of the three conditions are satisfied after repeated determinations, it becomes certain that the three conditions above last for the predetermined duration.

When it is certain that the three conditions above last for the predetermined duration, step S770 is performed to determine that the signal is stable.

In the above embodiment, in the simulation mode, the horizontal synchronization signals are generated according to a first PWM signal generated by a PWM circuit, and the vertical synchronization signals are generated according to a second PWM signal generated by the PWM circuit. However, instead of being construed as limitations to the present invention, it should be noted that, the PWM circuit is an example of the simulation signal generating circuit of the present invention, the first PWM signal is an example of the first simulation signal of the present invention, and the second PWM signal is an example of the second simulation signal of the present invention. In another embodiment, the simulation signal generating circuit may be a processor, the first simulation signal may be generated by controlling a potential level of a first general purpose input/output (GPIO) by the processor together with software, and the second simulation signal may be generated by controlling a potential level of a second GPIO by the processor together with software that.

As demonstrated by the embodiments of the video signal output system and method, two sets of horizontal synchronization signals and two sets of vertical synchronization signals may be generated by a dual-chip structure through the same set of PWM signals. Thus, asynchronous signals can be effectively prevented to ensure the a display device is properly lit up.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video signal output system with a synchronization signal simulation function, for displaying an image on a display device, comprising:
    a first video chip, comprising:
        a first video signal output circuit, outputting a first video output signal to the display device to display a part of the image, wherein the first video output signal comprises a first horizontal synchronization signal and a first vertical synchronization signal;
        a simulation signal generating circuit, outputting a first simulation signal and a second simulation signal;
        a first video graphics array (VGA) input end, receiving the first simulation signal and the second simulation signal;
        a first video end, receiving a first video input signal;
        a first multiplexer, receiving the first and the second simulation signal and the first video input signal; and
        a first controller, controlling the first multiplexer to output the first and second simulation signal or the first video input signal to the first video signal output circuit by outputting the first control signal to the first multiplexer;
    a second video chip, comprising:
        a second video signal output circuit, outputting a second video output signal to the display device to display the remaining part of the image, wherein the second video output signal comprises a second horizontal synchronization signal and a second vertical synchronization signal;
        a second VGA input end, receiving the first simulation signal and the second simulation signal;
        a second video input end, receiving a second video input signal;

a second multiplexer, receiving the first and second simulation signal and the second video input signal; and a second controller, controlling the second multiplexer to output the first and second simulation signal or the second video input signal to the second video signal output circuit by outputting the second control signal to the second multiplexer;

wherein, in a simulation mode:

the first controller controlling the first multiplexer to output the first and second simulation signal to the first video signal output circuit, and the first video signal output circuit generates the first horizontal synchronization signal according to the first simulation signal and generates the first vertical synchronization signal according to the second simulation signal;

the second controller controlling the second multiplexer to output the first and second simulation signal to the second video signal output circuit, and the second video signal output circuit generates the second horizontal synchronization signal according to the first simulation signal and generates the second vertical synchronization signal according to the second simulation signal.

2. The video signal output system according to claim 1, wherein the simulation signal generating circuit is a pulse width modulation (PWM) circuit, the first simulation signal is a first PWM signal, and the second simulation signal is a second PWM signal.

3. The video signal output system according to claim 1, wherein:

in the simulation mode, the first video chip determines whether a first video input signal is stable, and the second video chip determines whether a second video input signal is stable;

after the first video chip determines that the first video input signal is stable and the second video chip determines that the second video input signal is stable, the video signal output system enters a normal mode;

in the normal mode, the first video signal output circuit generates the first horizontal synchronization signal according to the first video input signal and generates the first vertical synchronization signal according to the first video input signal, and the second video signal output circuit generates the second horizontal synchronization signal according to the second video input signal and generates the second vertical synchronization signal according to the second video input signal.

4. The video signal output system according to claim 1, wherein:

in the normal mode, the first video chip determines whether the first video input signal is in an unstable state; and after the first video chip determines that the first video input signal is in the unstable state, the first video signal output circuit switches from the normal mode to the simulation mode.

5. The video signal output system according to claim 1, wherein the image comprises an on-screen display (OSD) picture in the simulation mode.

6. The video signal output system according to claim 1, wherein:

the first video chip further comprises a first video graphics array (VGA) input end, and receives the first simulation signal through a $13^{th}$ pin of the first VGA input end and receives the second simulation signal through a $14^{th}$ pin of the first VGA input end; and the second video chip further comprises a second VGA input end, and receives the first simulation signal through a $13^{th}$ pin of the second VGA input end and receives the second simulation signal through a $14^{th}$ pin of the second VGA input end.

7. A video signal output method, for displaying an image on a display device, the method comprising:

at a first video chip:

outputting, from a first video signal output circuit, a first video output signal to the display device to display a part of the image, wherein the first video output signal comprises a first horizontal synchronization signal and a first vertical synchronization signal;

outputting a first simulation signal and a second simulation signal;

receiving, at a first video graphics array (VGA) input end, the first simulation signal and the second simulation signal;

receiving, at a first video end, a first video input signal;

receiving, at a first multiplexer, the first and the second simulation signal and the first video input signal; and controlling, at a first controller, the first multiplexer to output the first and second simulation signal or the first video input signal to the first video signal output circuit by outputting the first control signal to the first multiplexer;

at a second video chip:

outputting, from a second video signal output circuit, a second video output signal to the display device to display the remaining part of the image, wherein the second video output signal comprises a second horizontal synchronization signal and a second vertical synchronization signal;

receiving, at a second VGA input end, the first simulation signal and the second simulation signal;

receiving, at a second video input end, a second video input signal;

receiving, at a second multiplexer, the first and second simulation signal and the second video input signal; and controlling, at a second controller, the second multiplexer to output the first and second simulation signal or the second video input signal to the second video signal output circuit by outputting the second control signal to the second multiplexer;

wherein, in a simulation mode:

controlling, with the first controller, the first multiplexer to output the first and second simulation signal to the first video signal output circuit, and the first horizontal synchronization signal is generated according to the first simulation signal and the first vertical synchronization signal is generated according to the second simulation signal, and controlling, with the second controller, the second multiplexer to output the first and second simulation signal to the second video signal output circuit, and the second horizontal synchronization signal is generated according to the first simulation signal and the second vertical synchronization signal is generated according to the second simulation signal.

8. The video signal output method according to claim 7, wherein, the first simulation signal is a first PWM signal generated by a pulse width modulation (PWM) circuit, and the second simulation signal is a second PWM signal generated by the PWM circuit.

9. The video signal output method according to claim 7, further comprising:
   in the simulation mode, determining whether a first video input signal is stable, and determining whether a second video input signal is stable;
   after determining the first video input signal is stable and the second video input signal is stable, entering a normal mode;
   wherein, in the normal mode, the first horizontal synchronization signal is generated according to the first video input signal and the first vertical synchronization signal is generated according to the first video input signal, and the second horizontal synchronization signal is generated according to the second video input signal and the second vertical synchronization signal is generated according to the second video input signal.

10. The video signal output method according to claim 7, further comprising:
   in the normal mode, determining whether the first video input signal is in an unstable state; and
   after determining the first video input signal is in the unstable state, switching from the normal mode to the simulation mode.

11. The video signal output method according to claim 7, further comprising:
   in the simulation mode, the image comprises an on-screen display (OSD) picture.

12. The video signal output method according to claim 7, wherein:
   receiving the first simulation signal by a $13^{th}$ pin of a first video graphics array (VGA) input end, and receiving the second simulation signal by a $14^{th}$ pin of the first VGA input end; and
   receiving the first simulation signal by a $13^{th}$ pin of a second VGA input end, and receiving the second simulation signal by a $14^{th}$ pin of the second VGA input end.

* * * * *